H. C. HART.
ARTICLE OF CUTLERY.
APPLICATION FILED MAY 13, 1919.
1,332,255.
Patented Mar. 2, 1920.
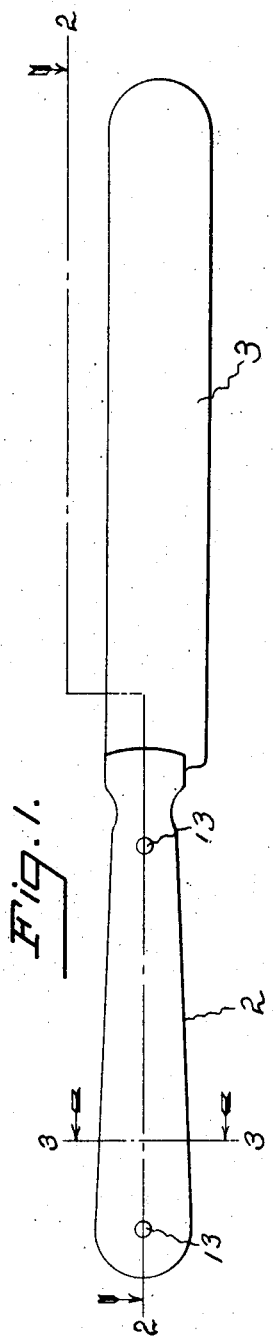
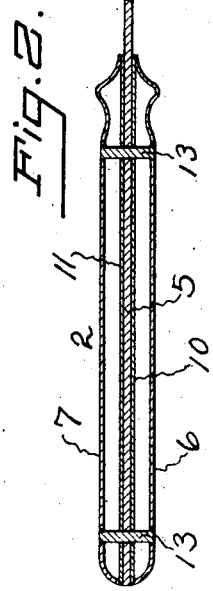
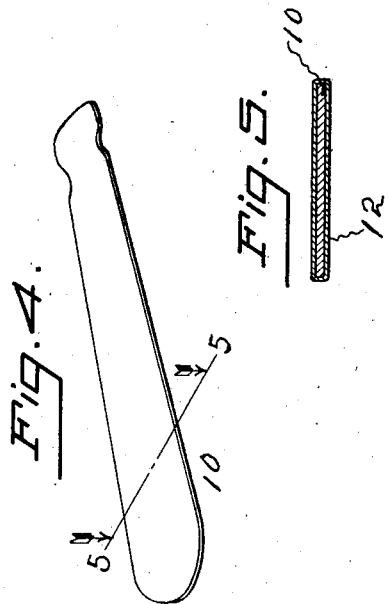
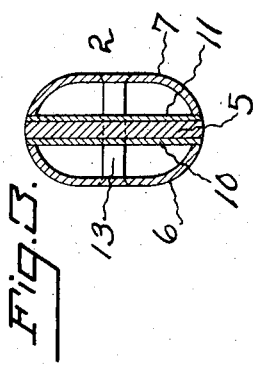
Inventor
H. C. Hart
By
Attorney

UNITED STATES PATENT OFFICE.

HUBERT C. HART, OF UNIONVILLE, CONNECTICUT.

ARTICLE OF CUTLERY.

1,332,255.      Specification of Letters Patent.      Patented Mar. 2, 1920.

Application filed May 13, 1919. Serial No. 296,907.

*To all whom it may concern:*

Be it known that I, HUBERT C. HART, a citizen of the United States, residing at Unionville, in the county of Hartford and State of Connecticut, have invented certain new and useful Improvements in Articles of Cutlery, of which the following is a specification.

This invention relates to what may be properly termed an "article of cutlery." It will be obvious from this observation that the invention is capable of use in various ways. That is to say, it may be embodied in knives, forks, spoons and such things, which are of course merely illustrative. I have several motives in view and probably the more important of them is the provision in an implement of the kind to which I have alluded and which has a hollow handle or like manipulating portion, of simple and effective means for excluding the entrance of water into the handle, the means being capable of easy association with the handle and susceptible of inexpensive and ready manufacture.

In the drawings accompanying and forming part of the present specification, I have shown in detail one of the several advantageous forms of embodiment of the invention which will be set forth fully in the following description. Clearly I am not restricted to this disclosure, as I may deviate therefrom in several ways within the scope of the invention defined by the claims following said description, which with the drawings, is provided to enable those skilled in the art to practise the invention.

Referring to said drawings:

Figure 1 is an elevation of an article of cutlery involving the invention.

Fig. 2 is a longitudinal section on the line 2—2 of Fig. 1, looking in the direction of the arrows.

Fig. 3 is a cross section on the line 3—3 of Fig. 1 looking in the direction of the arrows.

Fig. 4 is a perspective view of a packing.

Fig. 5 is a transverse section on the line 5—5 of Fig. 4, looking in the direction of the arrows.

Like characters refer to like parts throughout the different views which are on different scales.

In Letters Patent No. 1,161,665, granted to me November 23, 1915, and to which reference may be had, I cover an article of cutlery, and in a measure that embodied herein is along the same general lines or at least has the same motives in view, broadly speaking, as contemplated and obtained by the structure disclosed by the patent. It will of course be obvious that the invention can be associated with utility with hollow handles of various kinds of implements, several of which have been specifically identified. It will be understood that there are implements comprising a hollow handle and blade associated therewith, the tang or shank of the blade being ordinarily held within the handle. It is a fact, as I state in said prior patent, that when these knives or other implements having such hollow handles, are put into dish-water or washing water, the water passes into the handle, usually around the opening between the tang or shank of the blade and the handle. As I also state in said patent, this water usually remains in the handle, and is discharged therefore at inopportune times, such as in the case of a knife, when the user is eating a meal, the consequence being that particularly disagreeable effects ensue. I provide means hereby by which the admission of water into the handle during dish washing or something of a like nature, is positively prevented. The invention of the patent is of highly important nature, as I have demonstrated after long experience. Therefore, I secure all the many advantages obtained by the structure of the patent, but what is of vital importance I do so in a different way and really in a less expensive manner, so that, therefore, as I observe, I secure all the advantages possessed by the structure of the patent.

Referring now more particularly to the drawings, the numeral 2 designates a handle and 3 a blade. I of course use the term "blade" in a broad manner to include not only a knife blade as illustrated, but an equivalent part such as is present in a fork or a spoon, which are merely two of several kinds of blades. The blade comprises an operative, cutting or blade portion 4 and a tang or shank 5. The length of the tang or shank is equivalent or practically so, to that of the handle 2. The handle comprises duplicate portions or sides as 6 and 7. When the parts are in assembled relation, the tang in plan is approximately exactly like the faces of the handle portions or sections 6 and 7, the consequence being that when the tang is held between said sections, its outer edge is in exact register, or at least this is the preferable relation, with the outer edges of the handle portions or sections 6 and 7.

Between the handle 2 and the tang or shank 5 is interposed suitable packing means there being employed usually by me for this purpose desirably two packing sheets or strips 10 and 11. In shape these packing sheets agree substantially exactly with the form of the tang or shank. Each of them is preferably of paper waterproofed. It will be evident of course that I use this designation "paper" in a general sense. Its coating or covering is of some waterproof nature, and I have found a solution of paraffin as quite satisfactory. For illustration, I would employ in a solution a larger proportion of fluid, such as benzin or alcohol. Where I use one pint of paraffin for instance, I would use a gallon of the thinning fluid or practically that. The paper sheets 10 and 11 are dipped into the paraffin solution which gives them a coating as 12.

I prefer to apply to the opposite flat sides of the tang or shank 5 packing sheets as 10 and 11, the edges of the several parts being desirably, as will be inferred, in exact register. The handle portions or sections 6 and 7 are then fitted to the tang 5 or vice-versa, with the two packing sheets on the outside. This brings the lateral parts of the portions 6 and 7, sheets 10 and 11 and tang 5 into exact coincidence. When this is accomplished the parts may be united as by rivets 13. As a final operation, the implement may be buffed and then plated.

What I claim is:

1. An article of cutlery comprising a sectional handle, a blade provided with a tang extending into the handle, the sections of the handle being at opposite sides of the tang and waterproofed strips upon opposite sides of the tang, the lateral portions of the tang, the strips and the sections of the handle being approximately in register, the sections of the handle, the tang and the strips being united to each other.

2. An article of cutlery comprising a sectional handle, a blade provided with a tang extending into the handle, the sections of the handle being at opposite sides of the tang, waterproofed strips upon opposite sides of the tang, the lateral portions of the tang, the strips and the sections of the handle being approximately in register, and rivets passing through the sections of the handle, the tang, and the strips to hold the parts assembled.

In testimony whereof I affix my signature in the presence of two witnesses.

HUBERT C. HART.

Witnesses:
 MARGARET T. DENNIS,
 HEATH SUTHERLAND.